(12) United States Patent
Maïer-Hunke

(10) Patent No.: US 8,910,401 B2
(45) Date of Patent: Dec. 16, 2014

(54) NAMEPLATE

(75) Inventor: Horst-Werner Maïer-Hunke, Iserlohn (DE)

(73) Assignee: Durable "Hunke" & Jochheim GmbH & Co. KG, Iserlohn (DE)

( * ) Notice: Subject to any disclaimer, the term of this patent is extended or adjusted under 35 U.S.C. 154(b) by 1156 days.

(21) Appl. No.: 12/223,037

(22) PCT Filed: Dec. 29, 2006

(86) PCT No.: PCT/EP2006/012590
§ 371 (c)(1),
(2), (4) Date: Mar. 20, 2009

(87) PCT Pub. No.: WO2007/087894
PCT Pub. Date: Aug. 9, 2007

(65) Prior Publication Data
US 2009/0320336 A1 Dec. 31, 2009

(30) Foreign Application Priority Data
Jan. 24, 2006 (DE) .......................... 10 2006 003 545

(51) Int. Cl.
| | | |
|---|---|---|
| *A44C 3/00* | (2006.01) | |
| *G09F 3/20* | (2006.01) | |
| *B29C 45/73* | (2006.01) | |
| *B29C 45/00* | (2006.01) | |
| *B29C 45/33* | (2006.01) | |
| *B29C 45/44* | (2006.01) | |
| *B29L 7/00* | (2006.01) | |

(52) U.S. Cl.
CPC .............. *G09F 3/207* (2013.01); *B29C 45/73* (2013.01); *B29C 45/0055* (2013.01); *B29C 45/33* (2013.01); *B29C 45/4407* (2013.01); *B29C 2045/7343* (2013.01); *B29K 2995/0049* (2013.01); *B29L 2007/004* (2013.01)
USPC .................. 40/1.6; 40/1.5; 235/486; 150/147

(58) Field of Classification Search
USPC .................. 40/1.5, 469, 661, 661.04, 661.08; 264/263, 328.1, 318
See application file for complete search history.

(56) References Cited

U.S. PATENT DOCUMENTS

| | | | | |
|---|---|---|---|---|
| 4,000,570 A | * | 1/1977 | Carmen ........................... | 40/1.5 |
| 4,065,863 A | * | 1/1978 | Burgess .......................... | 40/490 |
| 4,869,004 A | * | 9/1989 | Maloney ......................... | 40/1.5 |
| 6,089,289 A | * | 7/2000 | Florjancic ...................... | 150/147 |
| 6,811,736 B1 | * | 11/2004 | Ohman et al. ................. | 264/478 |
| 7,228,651 B1 | * | 6/2007 | Saari ............................... | 40/1.5 |

FOREIGN PATENT DOCUMENTS

| | | |
|---|---|---|
| DE | 7716980 | 9/1977 |
| DE | 8901912 | 6/1989 |
| DE | 42 26 341 C2 | 2/1994 |

(Continued)

*Primary Examiner* — Charles A Fox
*Assistant Examiner* — Shin Kim
(74) *Attorney, Agent, or Firm* — Mark P. Stone

(57) ABSTRACT

A name badge, made from transparent plastic and having a front part (1) and a rear part (2) which is connected resiliently to the former via a first yoke (3) and having at least one retaining ridge (5) for a cardboard insert, said retaining ridge (5) protruding into the clearance between the front part (1) and the rear part (2), does not comprise a formed blank but rather an injection moulded part in a deviation from previous practice.

20 Claims, 4 Drawing Sheets

(56) References Cited

FOREIGN PATENT DOCUMENTS

| | | |
|---|---|---|
| DE | 86 22 508 U1 | 11/1996 |
| DE | 199122788 C | 9/2000 |
| EP | 0 286 061 B1 | 4/1988 |
| EP | 0 608 043 B1 | 1/1995 |
| JP | 08 085139 | 4/1996 |
| JP | 2000 052390 | 2/2000 |
| NL | 1008888 | 10/1999 |
| WO | 8203204 | 9/1982 |

\* cited by examiner

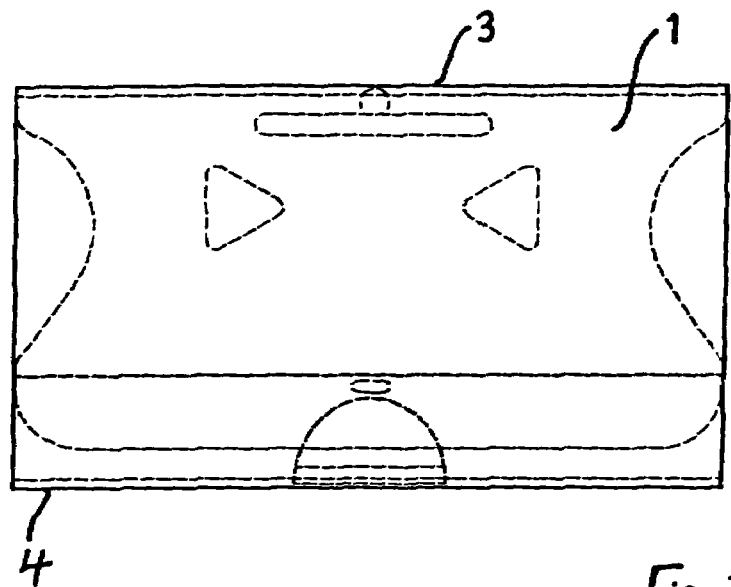
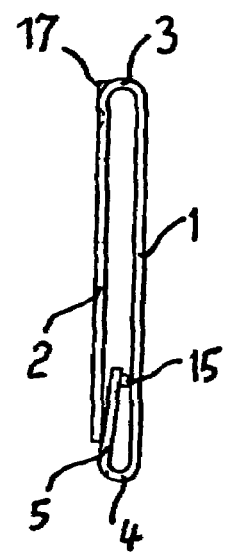
Fig. 1　　　Fig. 2
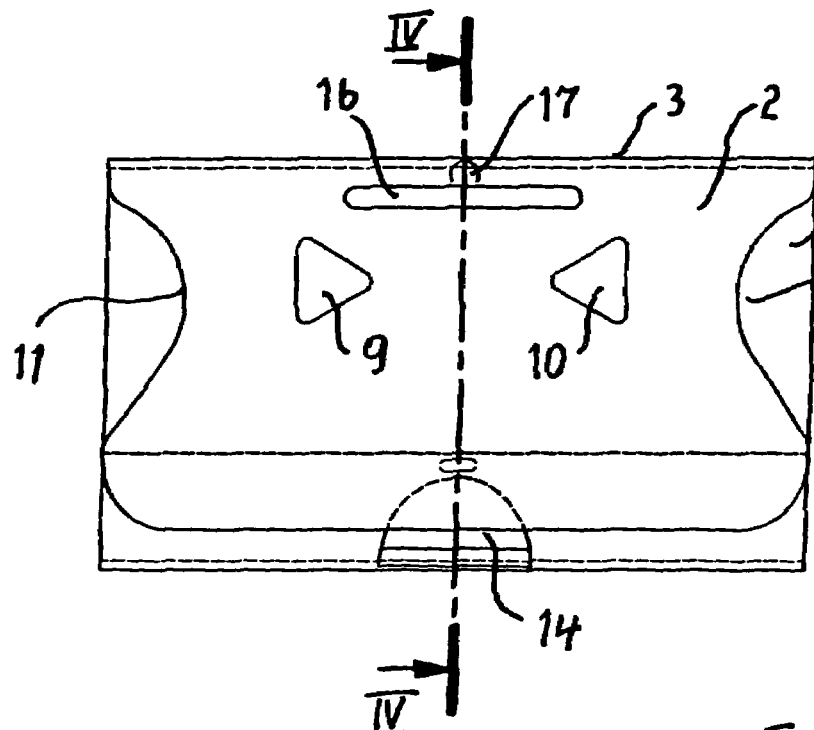
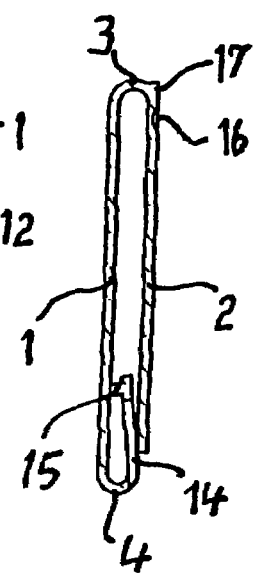
Fig. 3　　　Fig. 4

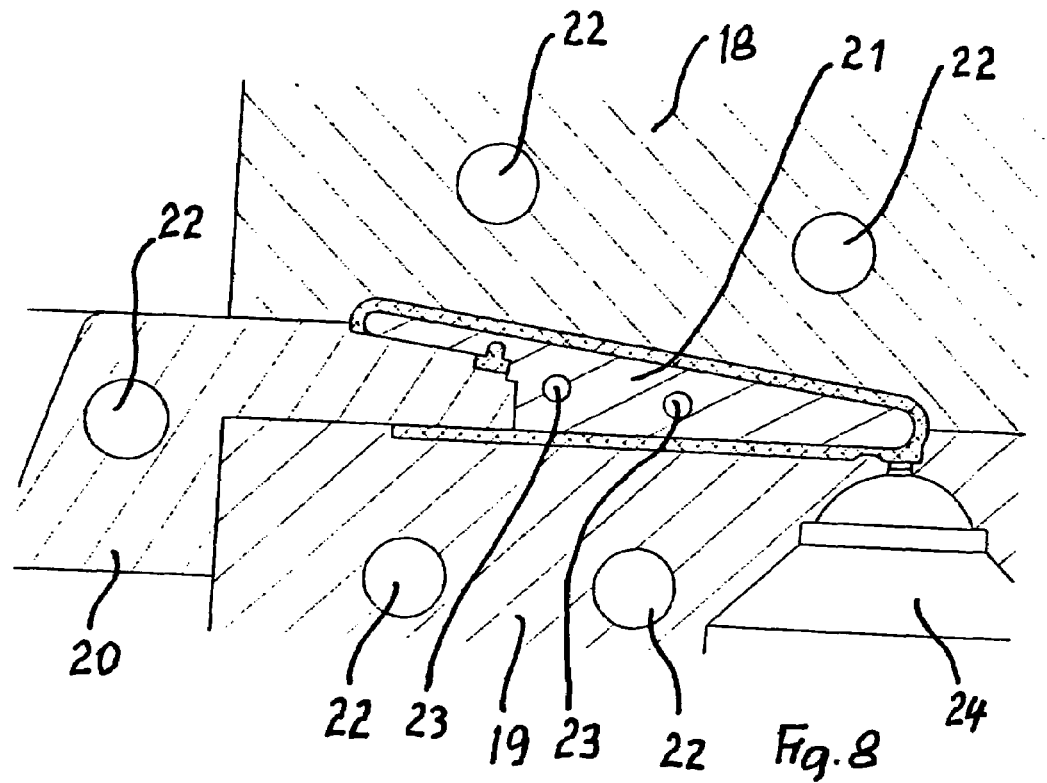
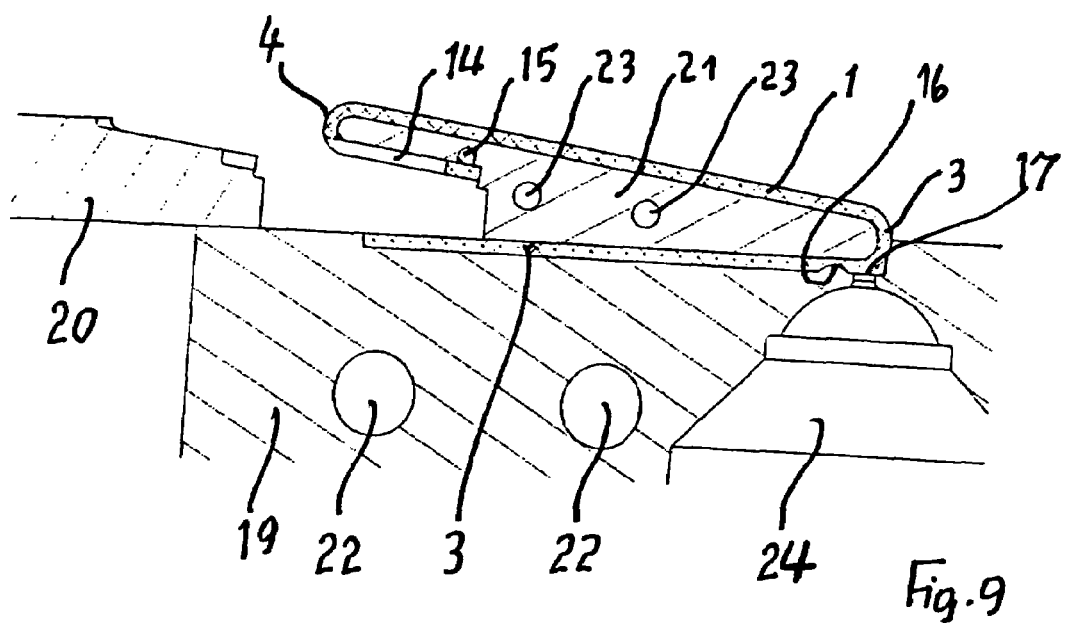

NAMEPLATE

TECHNICAL FIELD

The invention relates to a name badge of transparent plastic with a front part and a rear part, resiliently joined to the said front part by a first yoke, as well as with at least one retaining ridge, protruding in the clearance between the front part and the rear part and joined to the front part or rear part by a second yoke, for a cardboard insert which can be introduced into the gap formed by the retaining ridge and the front part of the badge from the side edges of the badge.

STATE OF THE ART

Name badges of the aforementioned type are for example also known from DE 89 01 912 U and DE 199 12 788 C2. They represent mass produced articles, which are frequently intended for once-only use at conferences, congresses and similar events. For the manufacture of the known name badges, blanks are stamped from polyacrylic or PVC films, the thickness of which in practice is no more than about 1 mm. These blanks are partially heated and folded several times to form the yokes. In other words for their manufacture stamping, heating and bending stages are necessary, of which in particular the heating stages take up a comparatively large amount of time due to the unavoidable heating and cooling phases. Added to that is a separate stamping process for those cases in which the badges are to be provided with manufacturer's information.

DESCRIPTION OF THE INVENTION

The object of the invention is to significantly reduce the manufacturing costs of appropriate name badges. This object is solved according to the invention in that the name badge is formed as an injection moulded part.

Through the replacement of the formerly usual deformation process by the injection moulding method using initially shapeless material, the manufacturing costs for name badges of the type under consideration can be drastically reduced, wherein this applies particularly to the case where multiple injection moulding tools are used.

The use of injection moulding methods for the manufacture of name badges is already known and in particular in conjunction with name badges which—as for example with name badges according to EP 0 608 043 B1—consist of two parts. With name badges consisting of two or also of several parts it is not only possible to dispense with spring effects, but rather the shape of the individual parts also does not present any problems with regard to injection moulding. Furthermore, from DE 77 16 980 U one-part name badges are known which consist only of two plane-parallel limbs which are joined together by a yoke and which at their lower ends delimit a more or less wide gap and consequently also present no problems for injection moulding. Since however there is no retaining ridge, they are not suitable for mounting cardboard inserts. It was the complicated shape of the name badges disclosed in DE 199 12 788 C2 which impaired their manufacture using injection moulding methods and which prevented experts in the field from using injection moulding methods for name badges of this nature. If it was not obvious however to injection mould this type of name badge for the reasons mentioned, then this logically also excludes obviousness of name badges of the type defined in Claim 1.

Through the merit of the applicant a way has been found which facilitates the realisation of name badges according to Claim 1 using injection moulding techniques. In other words the applicant has rendered possible something which has been regarded as impossible for decades, namely the manufacture of name badges using injection moulding methods, which ensure both reliable seating of the badge on the edge of an item of clothing as well as secure mounting of the cardboard insert inside the badge and this is realised with the skilful exploitation of the shrinkage property of the injection moulded part, which facilitates the realisation of a spring effect originating from the yokes as well as between the front and rear parts and also between the respective retaining ridge and the front or rear part facing it.

An object of the invention is therefore also a method for the manufacture of the claimed name badge.

Further features and details of the invention arise from the dependent claims as well as the enclosed drawings and their following description.

BRIEF DESCRIPTION OF THE DRAWINGS

The following are shown:

FIG. 1 the front view of a preferred embodiment of a name badge according to the invention, FIG. 2 the side view of the name badge according to FIG. 1, FIG. 3 the rear view of the name badge according to FIGS. 1 and 2, FIG. 4 a section along the line IV-IV in FIG. 3, FIG. 5 a name badge according to FIGS. 1 to 4, supplemented with a so-called combination clamp, FIG. 6 a name badge according to FIGS. 1 to 4, supplemented with a clip-type pin, FIG. 7 a detail view of the name badge according to FIG. 6 to an enlarged scale and partly sectioned, FIG. 8 the essential parts of the injection moulding tool used for the manufacture of the name badge according to FIGS. 1 to 4 after the finish of the injection moulding process, FIG. 9 an intermediate position of parts of the injection moulding tool on opening the tool, FIG. 10 an intermediate position following the intermediate position illustrated in FIG. 8 and FIG. 11 the end position of the name badge before removal from the tool.

METHODS OF REALISING THE INVENTION

Figure 5:
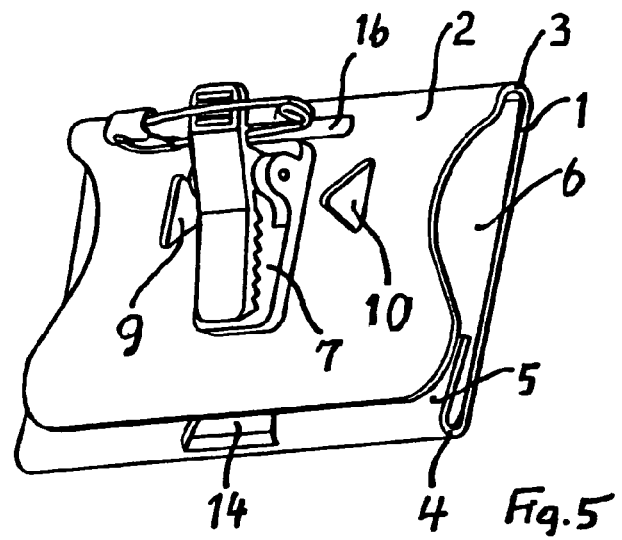
Figure 6:
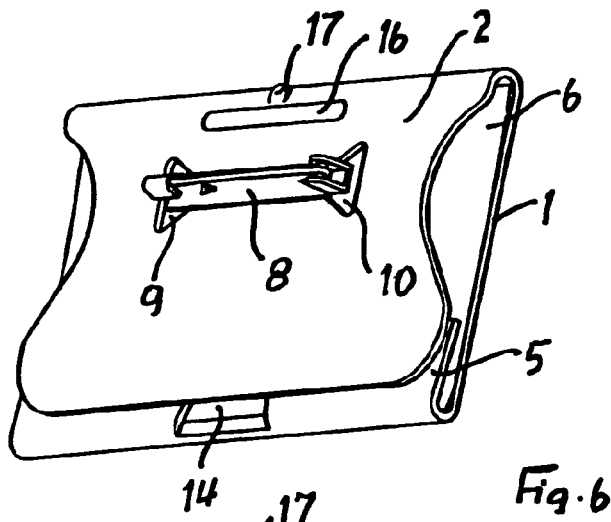
Figure 7:
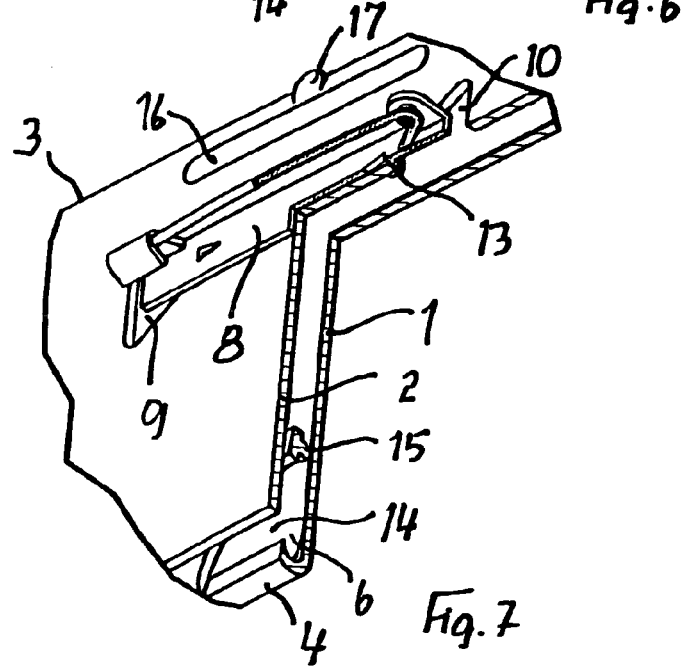
Figure 10:
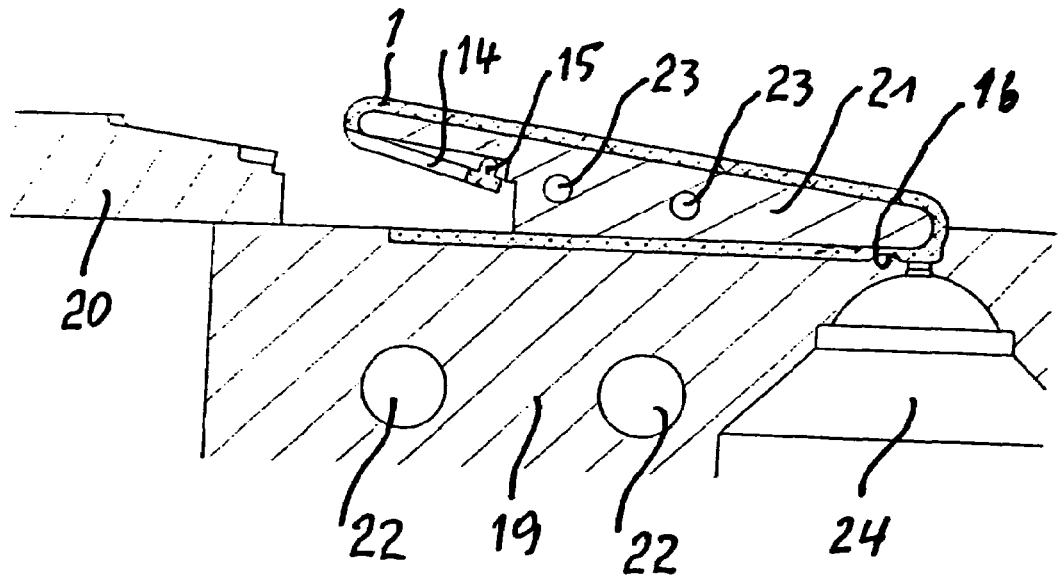
Figure 11:
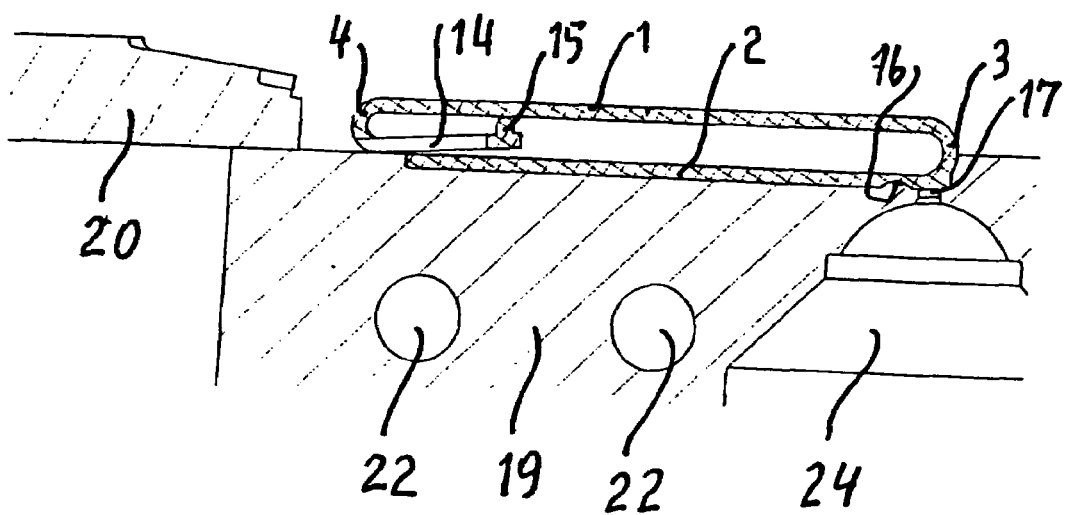

In FIGS. 1 to 4 the front part of a name badge is designated with 1 and the rear part with 2. Both parts 1 and 2 are joined together by a first yoke 3. On the lower edge of the front part a retaining ridge for a cardboard insert of the type illustrated in FIGS. 5 and 6, which can be inserted into the clearance between the front part 1 and the rear part 2, is connected by a second yoke 4. Yokes 3 and 4 form additional guides for the cardboard insert 6.

The name badge illustrated in FIGS. 1 to 4 is suitable only for insertion into a breast pocket of a jacket or shirt. To provide other methods of attachment, name badges are therefore often fitted with additional attachment means such as the combination clamp 7 illustrated in FIG. 5 or the clip-type pin 8 shown in FIG. 6.

The rear part 2 has two openings 9 and 10 as well as recesses 11 and 12. Both the openings 9 and 10 and the recesses 11 and 12 fulfil a double function in that they on one hand offer support of a part of the injection moulding tool during the injection moulding process and on the other hand—where the openings 9 and 10 are involved—facilitate easy attachment of the clip-type pin 8 fitted with claws 13 and—where the recesses 11 and 12 are involved—simplify the insertion and removal of the cardboard insert 6. A recess 14 in the centre of the retaining ridge 5, which is fitted with a clamping cam 15 on its lower edge, forming additional security against sideward movement of the cardboard insert 6, also provides support of a tool part. In the immediate vicinity of the first yoke 3 on the outer side of the rear part an elongated groove 16 is arranged which during the injection process fulfils the function of a flow retarder for the injected material forced into the tool at high pressure at the so-called gating point 17.

The essential parts of the injection moulding tool needed for the manufacture of the name badge illustrated in FIGS. 1 to 4 are illustrated in FIGS. 8 to 11. These parts involve two inserts 18 and 19, which can be implemented in the tool, and two slides 20 and 21, which are guided for to and fro movement in two directions displaced at 90° to one another in a housing which is not illustrated and which also accommodates the inserts 18, 19. The inserts 18, 19 and the slides 20, 21 are fitted with tempering channels 22 and 23 for cooling, of which those channels 22 arranged in the inserts 18, 19 and in the slide 20 have a significantly larger cross-section than the channels 23 in the slide 21. During the injection process the slide 21 consequently has a noticeably higher temperature than the slide 20 and the inserts 18 and 19. As already mentioned in the introduction, the different temperatures are of crucial importance for the manufacturing method used. This is because on opening the tool they cause different shrinkage processes due to the faster cooling of the outer side of the front part 1 and of the rear part 2 and the result of this is that after removal of the slide 21 from the position illustrated in FIG. 10 not only the front part 1 and the rear part 2, but also the retaining ridge 5 moves automatically from the widened position illustrated in FIGS. 8 to 10 to the position ready for use shown in FIG. 11. The normally undesired deformation of the injection moulded part is in other words exploited in the method described here in order to be able to manufacture the name badge at all. If the cavity of the tool, limited by the inserts 18, 19 and the slides 20, 21, were to actually correspond to the final shape of the name badge, then the stability of the slide 21 would not be sufficient to withstand the required injection pressure for the production of a thin-walled part, such as a name badge.

Since the material located in the region of the injection nozzle 24 is still in a viscous state, the produced name badge can be removed from the tool without problem either by a discharging stamp or by suction devices. In order to achieve the cleanest possible appearance of the gating point 17, the use of a valve gate nozzle is recommended, the needle of which with its face side promotes the formation of a smooth surface in the region of the gating point 17.

The invention claimed is:

1. Name badge of transparent plastic with a front part (1) and a rear part (2) joined to the said front part (1) by a first spring-loaded yoke (3), as well as with at least one retaining ridge (5), protruding in the intervening space between the front part (1) and the rear part (2) and joined to the front part (1) or rear part (2) by a second yoke (4), for a cardboard insert which can be introduced into the gap formed by the retaining ridge (5) and the front part (1) of the badge from the side edges of the badge, wherein both the front part (1) and also the retaining ridge (5) and the front part (1) or rear part (2) facing it contact one another due to a spring action from the yokes (3, 4), wherein said name badge is formed integrally as an injection moulded part such that at least one of said first and second yokes is sufficiently resilient to bias said front and rear parts towards each other.

2. Name badge according to claim 1, characterised in that it is provided with a gating point (17) in the region of the yoke (3) joining the front part (1) to the rear part (2).

3. Name badge according to claim 2, characterised in that the rear part (2) is provided with a groove (16) forming a flow retarder on its outer side below the gating point (17).

4. Name badge according to claim 1, characterised in that the retaining ridge (5) has at least one recess (14) which is open to the yoke (4) joining the said retaining ridge (5) to the front part (1) of the badge.

5. Name badge according to claim 1, characterised in that the retaining ridge (5) has at least one clamping toe (1.5) for the cardboard insert (6) on its side facing the front part (1).

6. Name badge according to claim 5, characterised in that the clamping toe (15) is arranged in the vicinity of the edge of the retaining ridge (5), which is located opposite the yoke (4) joining the retaining ridge (5) to the front part (1).

7. Name badge according to claim 1, characterised in that the rear part (2) has at least one through-hole (9, 10).

8. Name badge according to claim 1, characterised in that the rear part (2) is provided with recesses (11, 12) on its oppositely situated side edges.

9. Name badge according to claim 2, characterised in that the retaining ridge (5) has at least one recess (14) which is open to the yoke (4) joining the said retaining ridge (5) to the front part (1) of the badge.

10. Name badge according to claim 3, characterised in that the retaining ridge (5) has at least one recess (14) which is open to the yoke (4) joining the said retaining ridge (5) to the front part (1) of the badge.

11. Name badge according to claim 2, characterised in that the retaining ridge (5) has at least one clamping toe (15) for the cardboard insert (6) on its side facing the front part (1).

12. Name badge according to claim 3, characterised in that the retaining ridge (5) has at least one clamping toe (15) for the cardboard insert (6) on its side facing the front part (1).

13. Name badge according to claim 4, characterised in that the retaining ridge (5) has at least one clamping toe (15) for the cardboard insert (6) on its side facing the front part (1).

14. Name badge according to claim 11, characterised in that the clamping toe (15) is arranged in the vicinity of the edge of the retaining ridge (5), which is located opposite the yoke (4) joining the retaining ridge (5) to the front part (1).

15. Name badge according to claim 12, characterised in that the clamping toe (15) is arranged in the vicinity of the edge of the retaining ridge (5), which is located opposite the yoke (4) joining the retaining ridge (5) to the front part (1).

16. Name badge according to claim 2, characterised, in that the rear part (2) has at least one through-hole (9, 10).

17. Name badge according to claim 3, characterised in that the rear part (2) has at least one through-hole (9, 10).

18. Name badge according to claim 2, characterised in that the rear part (2) is provided with recesses (11, 12) on its oppositely situated side edges.

19. Name badge according to claim 3, characterised in that the rear part (2) is provided with recesses (11, 12) on its oppositely situated side edges.

20. Name badge according to claim 4, characterised in that the rear part (2) is provided with recesses (11, 12) on its oppositely situated side edges.

* * * * *